(12) United States Patent
Peng et al.

(10) Patent No.: US 8,508,930 B2
(45) Date of Patent: Aug. 13, 2013

(54) HARD DISK CARRYING APPARATUS

(75) Inventors: Cheng-Tzu Peng, Science-Based Industrial Park (TW); Char T. Vijay, Science-Based Industrial Park (TW); Hsiang-Chien Liu, Science-Based Industrial Park (TW); Chuan-Yi Yeh, Science-Based Industrial Park (TW); Chia-Wei Fan, Science-Based Industrial Park (TW)

(73) Assignee: Promise Technology, Inc., Hsinchu (TW)

( * ) Notice: Subject to any disclaimer, the term of this patent is extended or adjusted under 35 U.S.C. 154(b) by 389 days.

(21) Appl. No.: 13/072,505

(22) Filed: Mar. 25, 2011

(65) Prior Publication Data
US 2012/0113583 A1 May 10, 2012

(30) Foreign Application Priority Data
Nov. 5, 2010 (TW) .............................. 99138268 A

(51) Int. Cl.
*H05K 7/14* (2006.01)
(52) U.S. Cl.
USPC ................. 361/679.33; 361/727; 361/679.39; 312/223.1; 312/223.2

(58) Field of Classification Search
USPC .......... 361/679.31–679.39, 724–727, 679.01, 361/679.02, 679.57, 679.58, 679.46, 759; 312/223.1–223.2
See application file for complete search history.

(56) References Cited

U.S. PATENT DOCUMENTS
RE41,514 E * 8/2010 Behl et al. .................. 312/223.1

* cited by examiner

*Primary Examiner* — Jinhee Lee
*Assistant Examiner* — Ingrid Wright
(74) *Attorney, Agent, or Firm* — Wang Law Firm, Inc.; Li K. Wang; Stephen Hsu

(57) ABSTRACT

The invention discloses a hard disk carrying apparatus comprising a main body, a plurality of slide racks, and a plurality of valves. In the main body, an accommodating space is concavely disposed at a front side of the main body; a plurality of primary slide rails that are adjacent and parallel to each other are disposed on a bottom wall in the accommodating space; a plurality of secondary slide rails is disposed on a top wall in the accommodating space. Each of the plurality of slide racks is a long rack. Each of the plurality of valves is a long door plate member. An end of each valve is a pivot end that is pivotally installed at a bottom edge of the front side of the main body; the other end of the valve is a latch end that includes a locking element disposed thereon.

10 Claims, 11 Drawing Sheets

HARD DISK CARRYING APPARATUS

BACKGROUND OF THE INVENTION

1. Field of the Invention

The present invention relates to a hard disk carrying apparatus, and more particularly to a carrying apparatus for concentratedly disposing hard disks as well as integrating and systematizing the hard disks.

2. Description of the Related Art

As science and technology advance, computer system related technologies are improved constantly, and it is very popular for companies to use a computerized management system to control and manage internal operations and resources of the companies. However, a very large storage capacity is required for data storage of a computer system. For example, a system server of a network generally requires a storage space more than several hard disks, and thus the system server must have a large number of hard disks and a hard disk carrying apparatus for carrying the hard disks and centralizing the storage of the hard disks, while integrating the hard disks into the hard disk carrying apparatus as a united storage space.

The concept of this type of hard disk carrying apparatuses comprises a retaining base for disposing the plurality of hard disks, and the design of most of these hard disk carrying apparatuses do not have the stability of fixing the hard disks, but the use of apparatuses of this sort requires a high stability to prevent an abnormal operation of the hard disk, particularly when the hard disk is collided or shook. In general, a hard disk is carried by a hard disk box or a hard disk tray, such that the hard disk can be fixed or slidably detached. However, such arrangements have drawbacks of the actual use of spaces and usually involve a complicated structure, not only increasing unnecessary weight, but also causing a heat dissipating issue of the hard disk. In addition, a conventional hard disk box generally includes a valve installed at a front end of the hard disk box for fixing and detaching the hard disk box with respect to the retaining base to facilitate fixing the hard disk box to the retaining base and providing an easy swapping feature. However, the design of the valve according to the present existing technology primarily focuses on the easiness of opening and closing the valve, but ignores the prevention of opening the valve by unexpected external forces. In practical applications, it becomes a factor of an unstable system. Obviously, the conventional hard disk carrying apparatus requires further improvements. In view of the shortcomings of the prior art, the inventor of the present invention based on years of experience to conduct extensive researches and experiments, and finally developed a hard disk carrying apparatus and its hard disk box in accordance with the present invention, in hope of overcoming the shortcomings of the prior art.

SUMMARY OF THE INVENTION

Therefore, it is a primary objective of the present invention to overcome the aforementioned shortcomings of the prior art by providing a hard disk carrying apparatus in accordance with the present invention.

To achieve the foregoing objective, the present invention discloses a hard disk carrying apparatus comprising a main body, a plurality of slide racks, and a plurality of valves.

The main body has an accommodating space concavely disposed at a front side of the main body. In the main body, a plurality of primary slide rails that are adjacent and parallel to each other are disposed on a bottom wall in the accommodating space; a position limiting element is disposed on a wall at an external end of each primary slide rail; and a plurality of secondary slide rails is disposed on a top wall in the accommodating space and corresponding to the primary slide rails respectively. Wherein, the number of the secondary slide rails is equal to the number of the primary slide rails, and each secondary slide rail and each corresponding primary slide rail are provided to define a hard disk carrying space. In the main body, at least one pushing element is disposed on a wall of each secondary slide rail; an electric connection terminal is disposed on an internal wall of the main body and at a position corresponding to each hard disk carrying space for installing and coupling the plurality of hard disks; a latch plate is disposed at a top edge on the front side of the main body; and a latch slot is disposed on the latch plate and at a position corresponding to each hard disk carrying space.

Each of the plurality of slide racks is a long rack, and has a shape corresponding to a lateral edge of the hard disk and provided for installing the hard disk, so that each slide rack may be slidably moved along the primary slide rails respectively to enter and exit the hard disk carrying space. In each slide rack, at least one push member is disposed on a top side of the slide rack; a position limiting portion is disposed on a wall of the slide rack and is selectively latched with the position limiting element to provide a maximum position limit of sliding the slide rack towards an external side, so as to prevent the slide rack from sliding out of the hard disk carrying space.

Each of the plurality of valves is a long door plate member. Wherein, an end of each valve is a pivot end that is pivotally installed at a bottom edge of the front side of the main body and corresponding to the hard disk carrying space to selectively close an opening of the hard disk carrying space. The other end of the valve is a latch end that includes a locking element disposed thereon and selectively passed into the latch slot and correspondingly latched onto the latch plate to provide a lock protection function.

In the hard disk carrying apparatus, the locking element may include a fixing plate, an extended press plate and an inverted hook portion. The fixing plate is installed at the latch end, while the extended press plate is elastic and extends from and opposite to the fixing plate to form a bent portion with the fixing plate. Furthermore, the bent portion is corresponding to the latch slot and selectively passed into the latch slot. An inverted hook portion is disposed on an external wall of the extended press plate for latching the latch plate after the bent portion is passed into the latch slot. The fixing plate further includes a through hole formed thereon, and the valve further includes a door bolt disposed at the latch end, and the door bolt includes a bolt element and a bolt button. The bolt element is selectively passed through the through hole of the fixing plate and pushed against the extended press plate to stop the extended press plate from moving towards the fixing plate. The bolt button is disposed on an external wall of the valve for selectively driving the bolt element to protrude and press against the extended press plate or retract from the extended press plate. Each primary slide rail further includes an elastic plate disposed on a wall at an internal end of the primary slide rail for providing an upward elastic force, and the slide rack will press onto the elastic plate after the slide rack is passed into the hard disk carrying space.

In the hard disk carrying apparatus, the position limiting element is a position limiting pillar or a position limiting bolt protruded from the primary slide rail, and the position limiting portion is a long slot sheathed onto the position limiting pillar or the position limiting bolt. The pushing element is a pillar shaped element that provides a downward pushing elastic force, and the push member is a pillar shaped element that provides an upward pushing elastic force. The slide rack further includes at least one elastic frictional element installed on a wall opposite to the primary slide rail for pushing the primary slide rail when the slide rack slides on the primary slide rail. The slide rack includes a hook portion protruded from an external end of the slide rack, while the valve includes a hook part extended from the pivot end and corresponding to the hook portion. The hook part is provided for hooking the slide rack out during a motion of pivotally turning to open the main body, and pushing the slide rack inward during a motion of pivotally closing the valve with respect to the main body. The hard disk carrying apparatus further comprises a heat dissipating fan installed at a position corresponding to the rear side of the main body, wherein the total number of the hard disk carrying space is equal to four.

In the design of the hard disk carrying apparatus in accordance with the present invention, the hard disk carrying apparatus provides a plurality of hard disk carrying spaces for carrying a plurality of hard disks and further provides a plurality of elastic elements disposed on top and bottom walls in the hard disk carrying space for securing the hard disks. In addition, the elastic elements provide a vibration absorption effect for absorbing vibration forces to maintain a stable operation of a computer system when the hard disk carrying apparatus is collided, shook or vibrated. Unlike the conventional tray or fixing box, the slide rack of the present invention can be used for swapping and installing the hard disks from a lateral side, such that the occupied space can be reduced, the structure can be simplified, the total weight can be reduced, and the heat generated from the operation of the hard disk can be dissipated efficiently. In addition, the latch end of the valve facilitates opening the hard disk carrying apparatus and comes with a lock protecting design for the convenience of operating the hard disk carrying apparatus. The valve further includes a door bolt installed thereon and provided for stopping the valve from being opened unexpectedly, so as to enhance the stability of the operation of the hard disks.

DETAILED DESCRIPTION OF THE PREFERRED EMBODIMENTS

Figure 1:
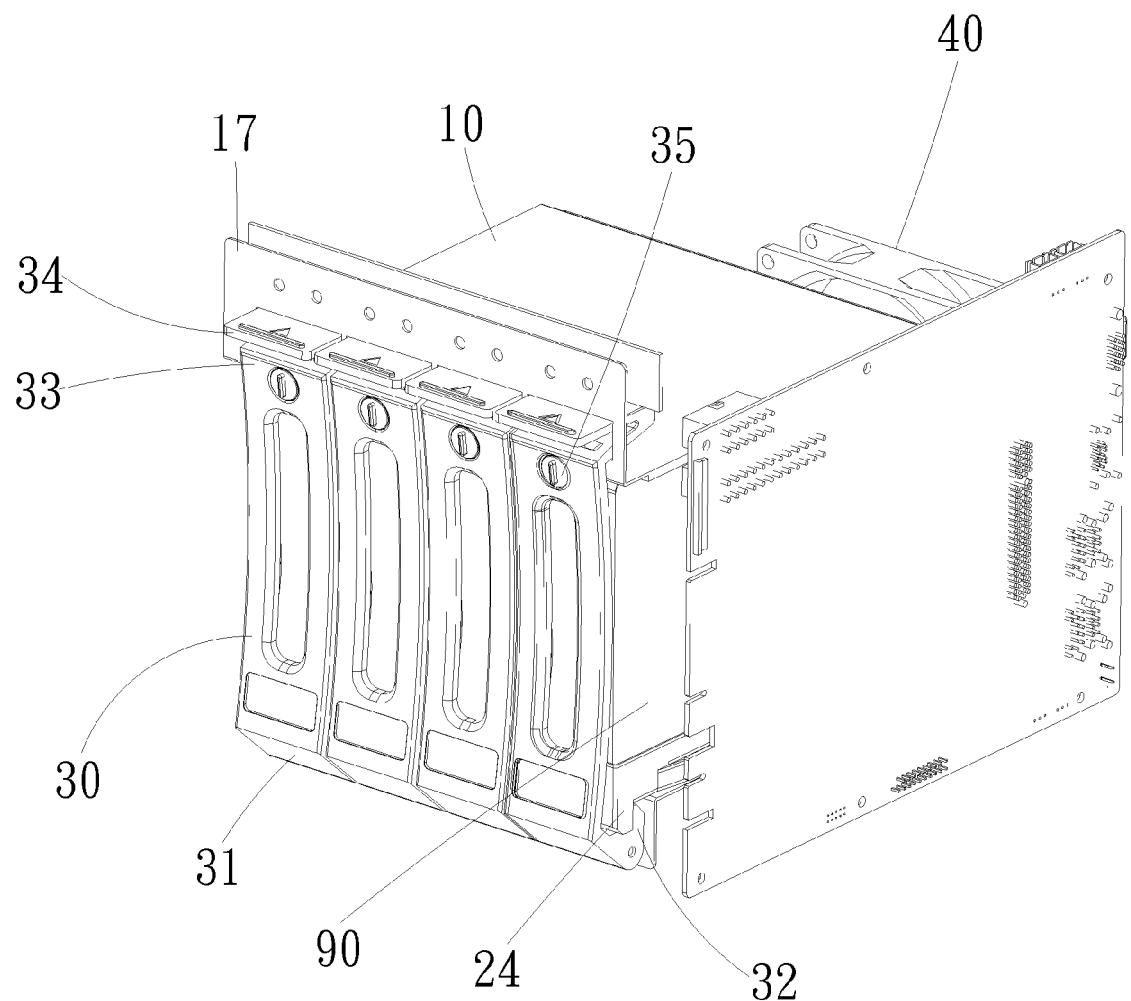
FIG. 1 is a schematic diagram of a hard disk carrying apparatus of the present invention.
Figure 2:
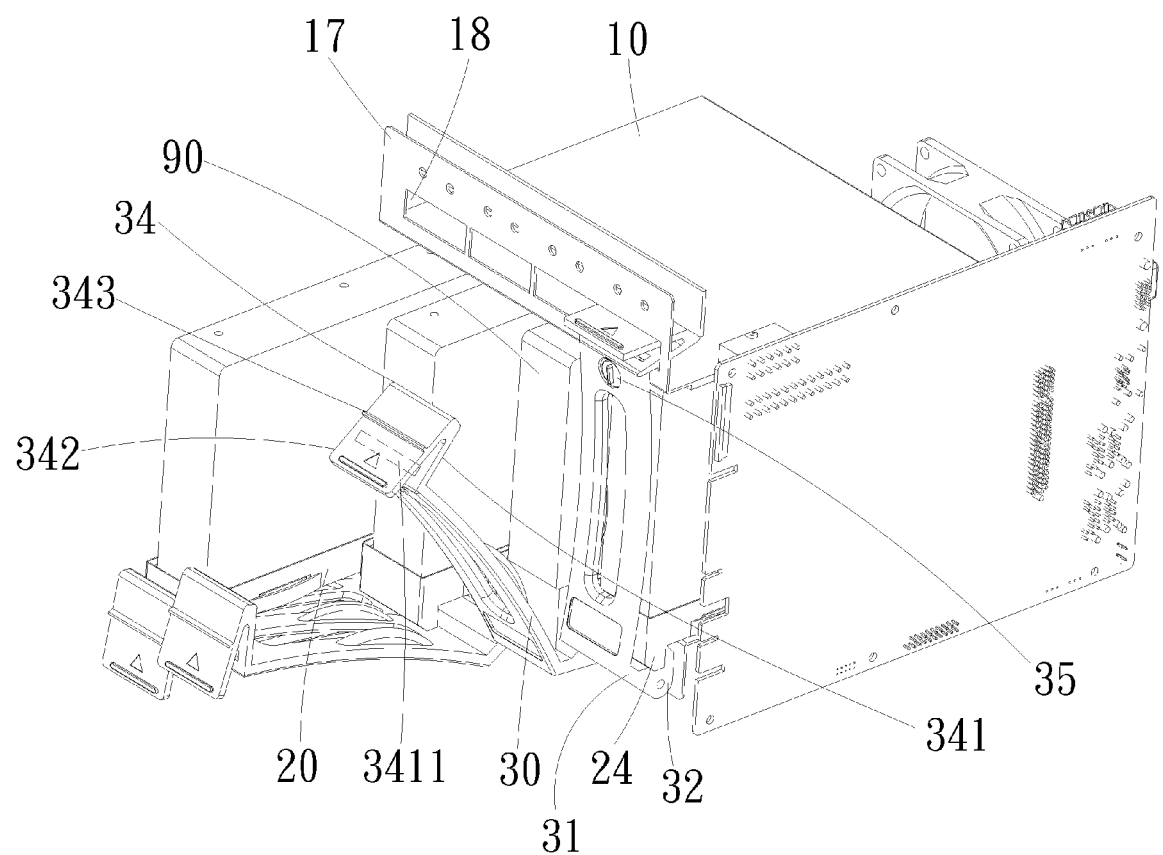
FIG. 2 is a schematic diagram of a hard disk carrying apparatus in accordance with a first preferred embodiment of the present invention.
Figure 3:
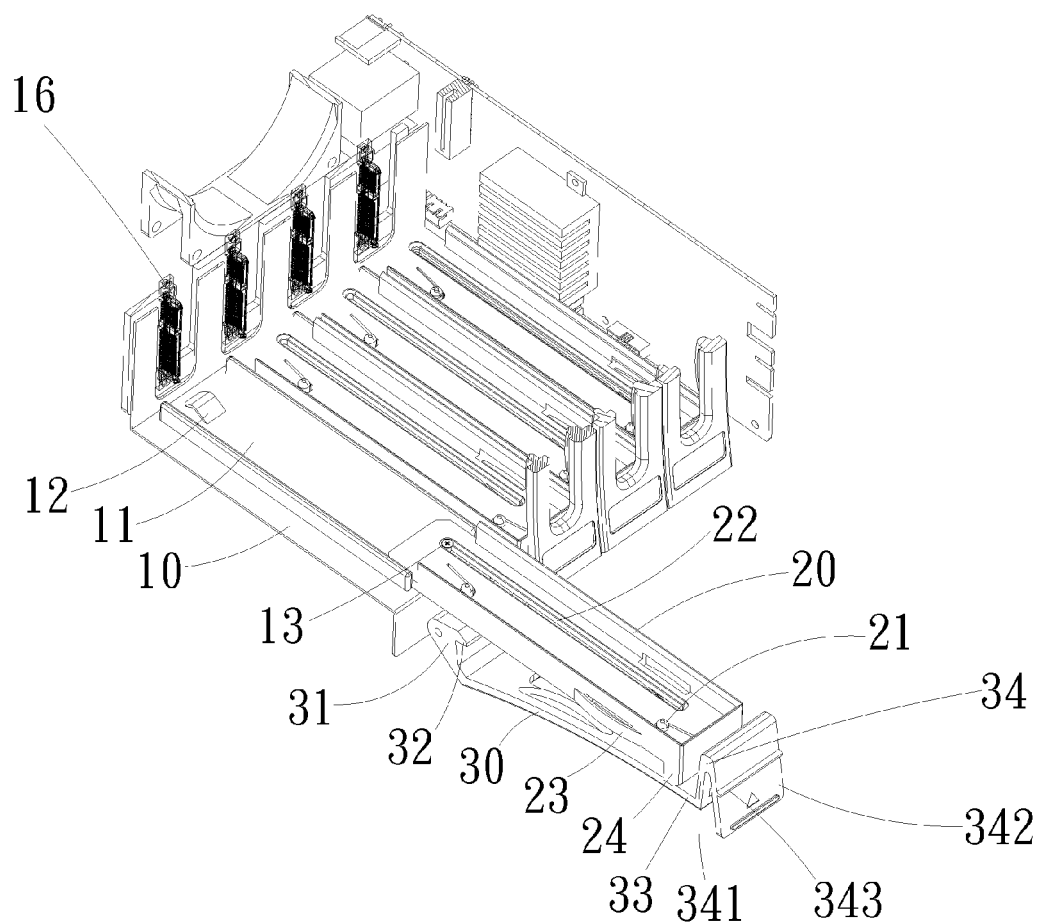
FIG. 3 is a cross-sectional view of a hard disk carrying apparatus of the present invention.
Figure 4:
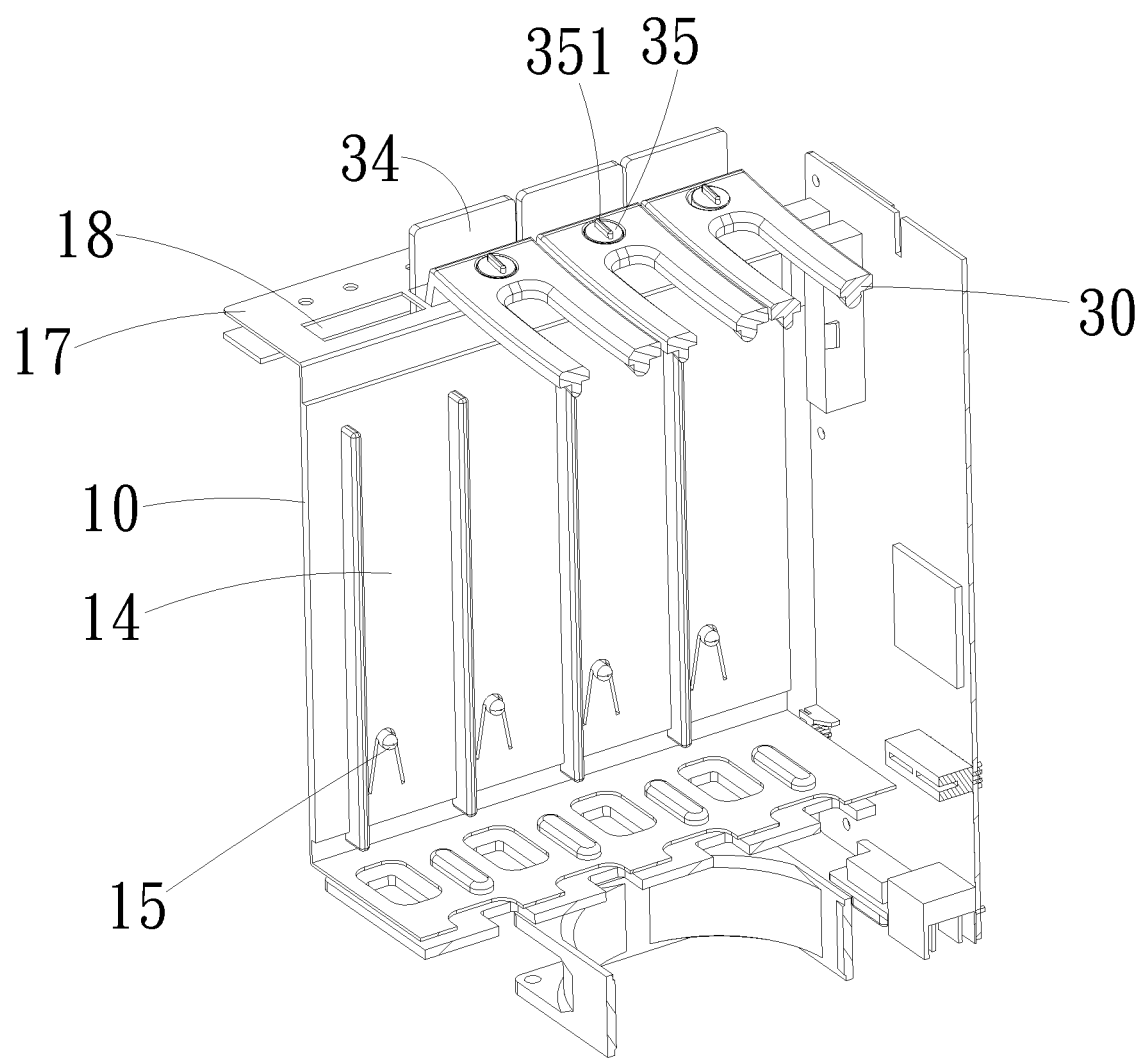
FIG. 4 is another cross-sectional view of a hard disk carrying apparatus of the present invention viewed from another viewing angle.

The foregoing and other objectives, characteristics, advantages and effects of the present invention will become apparent by the detailed description of a preferred embodiment as follows. It is noteworthy to point out that the drawings are provided for the purpose of illustrating the present invention, but they are not necessarily drawn according to the actual proportion and the precise installation of components. Therefore, the scope of the present invention should not be limited by the proportion and installation of the components as shown in the drawings.

With reference to FIGS. 1 to 4 for a hard disk carrying apparatus in accordance with a preferred embodiment of the present invention, the hard disk carrying apparatus comprises a main body 10, a plurality of slide racks 20, a plurality of valves 30 and a heat dissipating fan 40.

The main body 10 is a housing with an accommodating space concavely formed at a front side of the main body 10. In the main body 10, a plurality of primary slide rails 11 that are adjacent and parallel to each other are disposed on a bottom wall of the accommodating space. An elastic plate 12 is disposed on a wall at an internal end of each primary slide rail 11 for providing an upward elastic force; a position limiting element 13 is disposed on a wall at an external end of the primary slide rail 11. The position limiting element 13 may be a position limiting pillar or a position limiting bolt protruded from the primary slide rail 11. In the main body 10, a plurality of secondary slide rails 14 is disposed on a top wall in the accommodating space and corresponding to the primary slide rails 11 respectively, wherein the quantity of the secondary slide rails 14 is equal to that of the primary slide rail 11, and each secondary slide rail 14 and each corresponding primary slide rail 11 define a hard disk carrying space.

The total number of the hard disk carrying space can be designed according to actual using requirements. For example, four hard disk carrying spaces are provided for correspondingly carrying four hard disks 90. Moreover, at least one pushing element 15 can be installed on a wall of each secondary slide rail 14, and the pushing element 15 is a pillar shaped element for providing a downward pushing elastic force. In addition, an electric connection terminal 16 is installed on an internal wall of the main body 10 and at a position corresponding to each hard disk carrying space for connecting the hard disk 90. Furthermore, a latch plate 17 is installed at a top edge of the front side of the main body 10, and a latch slot 18 is formed on the latch plate 17 and at a position corresponding to each hard disk carrying space.

The slide rack 20 may be a long rack that is slidably installed on the primary slide rail 11 and capable of being passed in and out of the hard disk carrying space. Moreover, the slide rack 20 has a shape corresponding to a lateral edge of the hard disk 90 and provided for leaning against the hard disk 90, such that after a user places and slides the hard disk 90 into the hard disk carrying space, the slide rack 20 will slide to press onto the elastic plate 12, and an upper elastic force is provided to the slide rack 20 to provide the functions of fixation and vibration absorption. In addition, at least one push member 21 is disposed on the top side of the slide rack 20, wherein the push member 21 is a pillar shaped element that provides an upward pushing elastic force, such that after a user places the hard disk 90 on the slide rack 20, elastic forces produced by the pushing from the push member 21 and the pushing element 15 provides a clamping effect for fixing the hard disk 90 securely into the hard disk carrying space.

Furthermore, a position limiting portion 22 is disposed on a wall of the slide rack 20 and selectively latched with the position limiting element 13 to provide a maximum position limit of sliding the slide rack 20 towards the outside in order to prevent the slide rack 20 from sliding out of the hard disk carrying space. The position limiting portion 22 can be a long slot sheathed onto the position limiting pillar or the position limiting bolt. At least one elastic frictional element 23 can be disposed on the slide rack 20 and at a position opposite to a wall of the primary slide rail 11 for pushing the primary slide rail 11 to provide a friction when the slide rack 20 slides on the primary slide rail 11, so as to provide a stable force and a vibration absorption function, and a hook portion 24 is formed and protruded from an external end of the slide rack 20.

Figure 5:
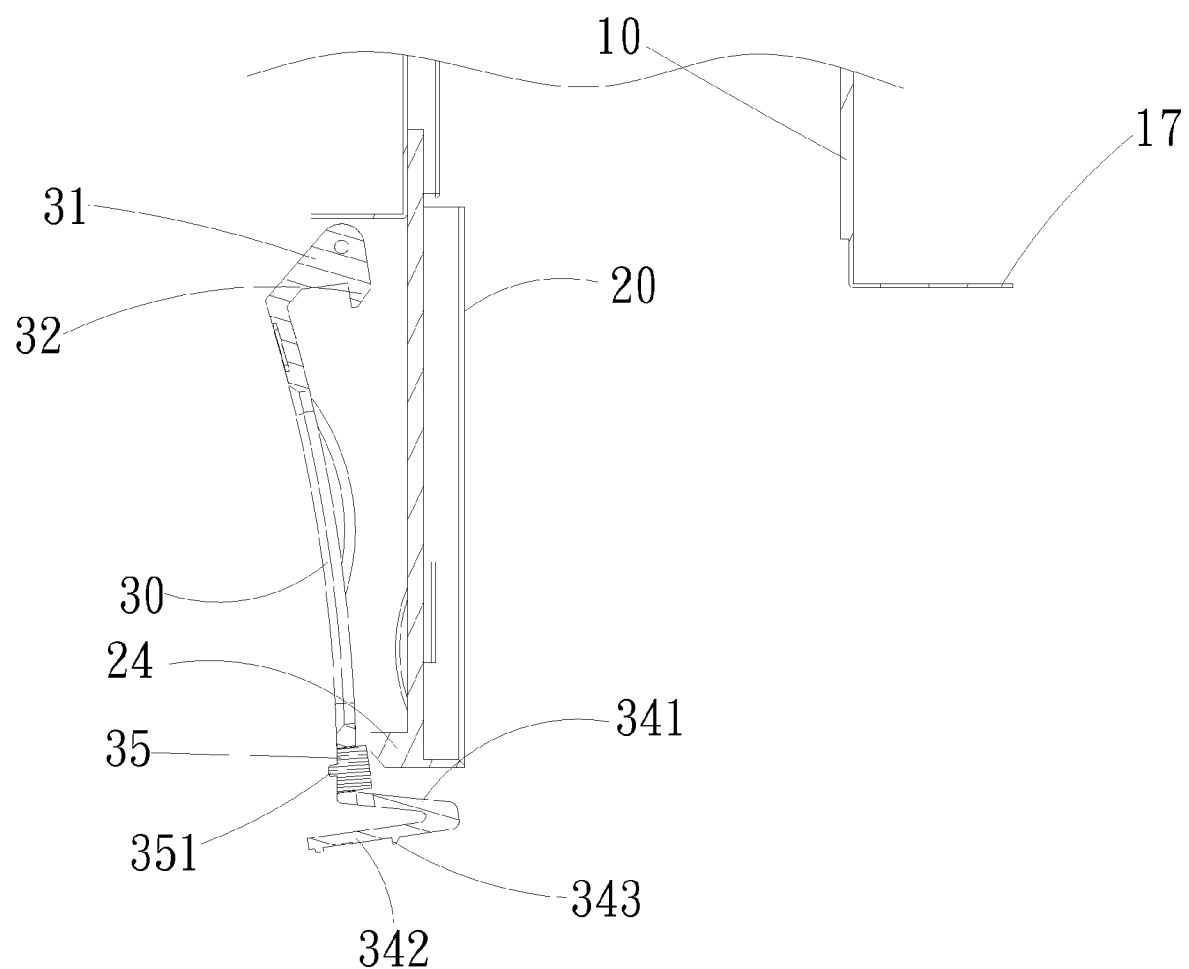
FIG. 5 is a side cross-sectional view of a hard disk carrying apparatus in accordance with a preferred embodiment of the present invention.
Figure 6:
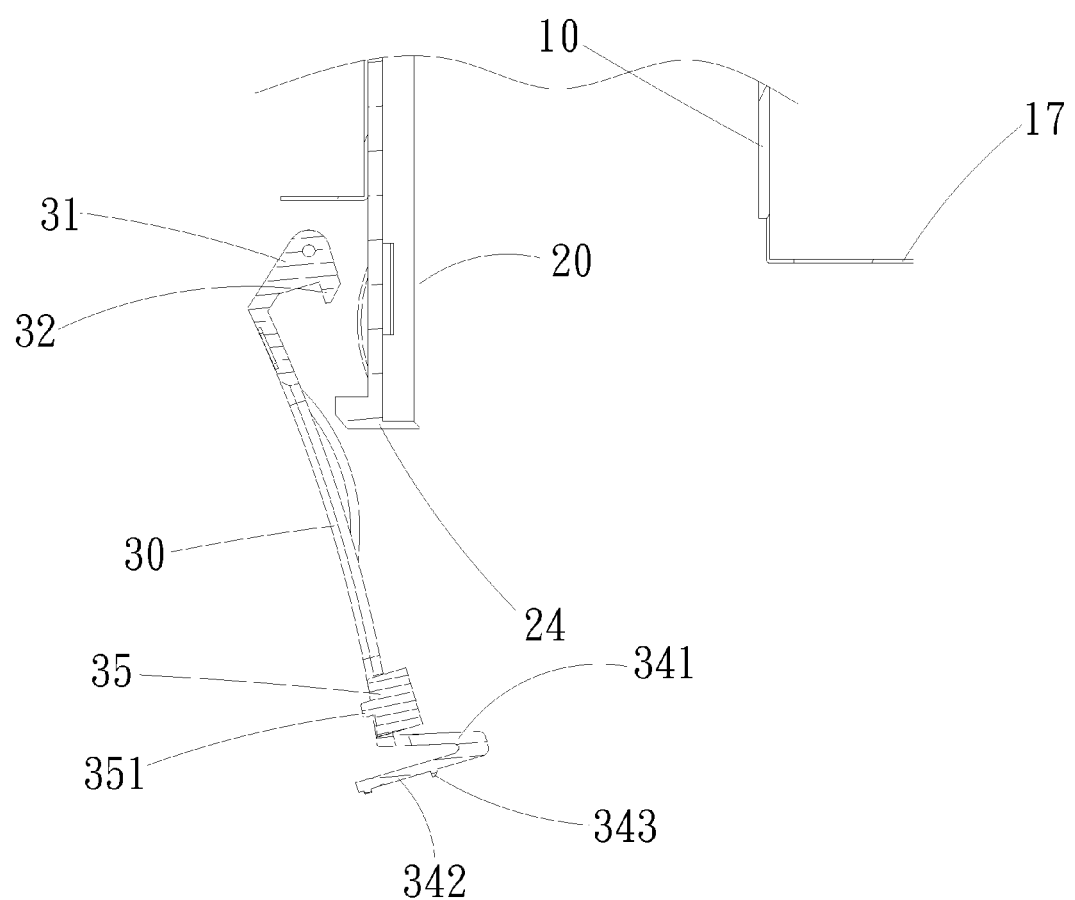
FIG. 6 is a side cross-sectional view of a hard disk carrying apparatus in accordance with a preferred embodiment of the present invention.
Figure 7:
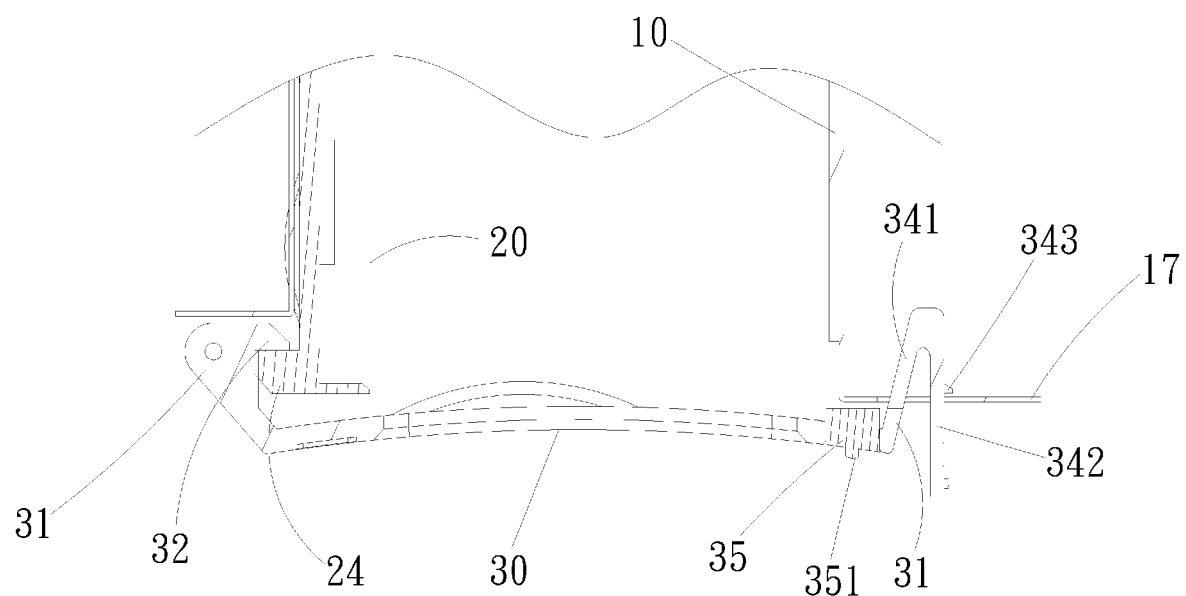
FIG. 7 is a side cross-sectional view of a hard disk carrying apparatus in accordance with a preferred embodiment of the present invention.

The valve 30 is a long door plate member, whose end is a pivot end 31 pivotally installed at the bottom edge of the front side of the main body 10 and corresponding to one of the hard disk carrying spaces, and is provided for selectively sealing an opening of the hard disk carrying space by a pivotal turning motion. Wherein, a hook part 32 is upwardly extended from the pivot end 31 of the valve 30 and disposed corresponding to the hook portion 24 for hooking the slide rack 20 out during a motion of pivotally opening the main body 10. In addition, the slide rack 20 is pressed to push the slide rack 20 towards the inside during a motion of pivotally closing the main body 10 by the valve 30, such that a user can remove or dispose the hard disk easily. The related motion is shown in FIGS. 5 to 7. In addition, the other end of the valve 30 is a latch end 33, and the latch end 33 has a locking element 34 disposed thereon and selectively passed into the latch slot 18 for latching onto the latch plate 17. The locking element 34 comprises a fixing plate 341, an extended press plate 342 and an inverted hook portion 343, wherein the fixing plate 341 is disposed at the bolt locking end 33, and a through hole 3411 may be disposed on the fixing plate 341. The extended press plate 342 is elastic, extends from and opposite to the fixing plate to form a bent portion with the fixing plate 341, and is disposed at a position corresponding to the latch slot 18 for selectively passing into the latch slot 18. The inverted hook portion 343 is disposed on an external wall of the extended press plate 342, such that after the bent portion is passed into the latch slot 18, the inverted hook portion 343 is latched to the latch plate 17 for providing a lock protecting and fixing function.

Figure 8:
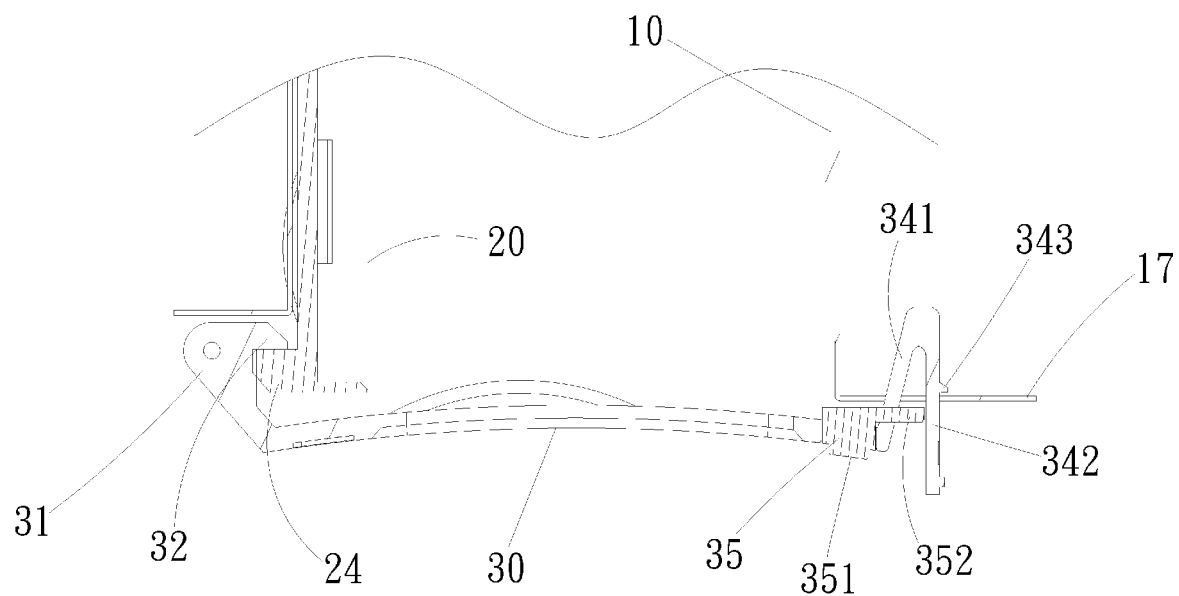
FIG. 8 is a side cross-sectional view of a hard disk carrying apparatus in accordance with a preferred embodiment of the present invention.

With reference to FIG. 8, the valve 30 further includes a door bolt 35 at the latch end 33, and the door bolt includes a bolt element 351 and a bolt button 352, wherein the bolt element 351 is selectively passed through the through hole 3411 of the fixing plate 341 to push the extended press plate 342 in order to stop the extended press plate 342 from moving towards the fixing plate 341. Since the bent portion has a reduced cross-sectional area, therefore it can be passed out of the latch slot 18. The bolt button 352 is disposed on an external wall of the valve 30 for selectively driving the bolt element 351 to protrude thereby propping against the extended press plate 342 or retract from the extended press plate 342.

Figure 9:
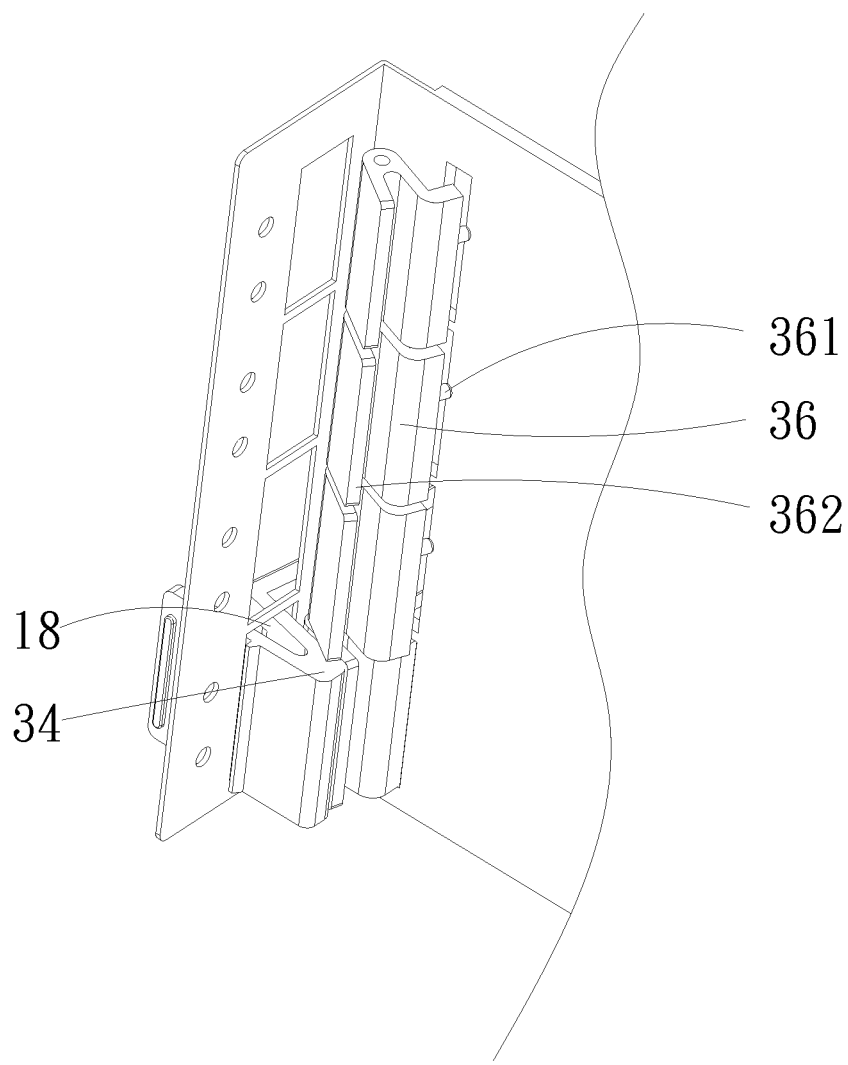
FIG. 9 is a schematic diagram of a hard disk carrying apparatus in accordance with a preferred embodiment of the present invention.
Figure 10:
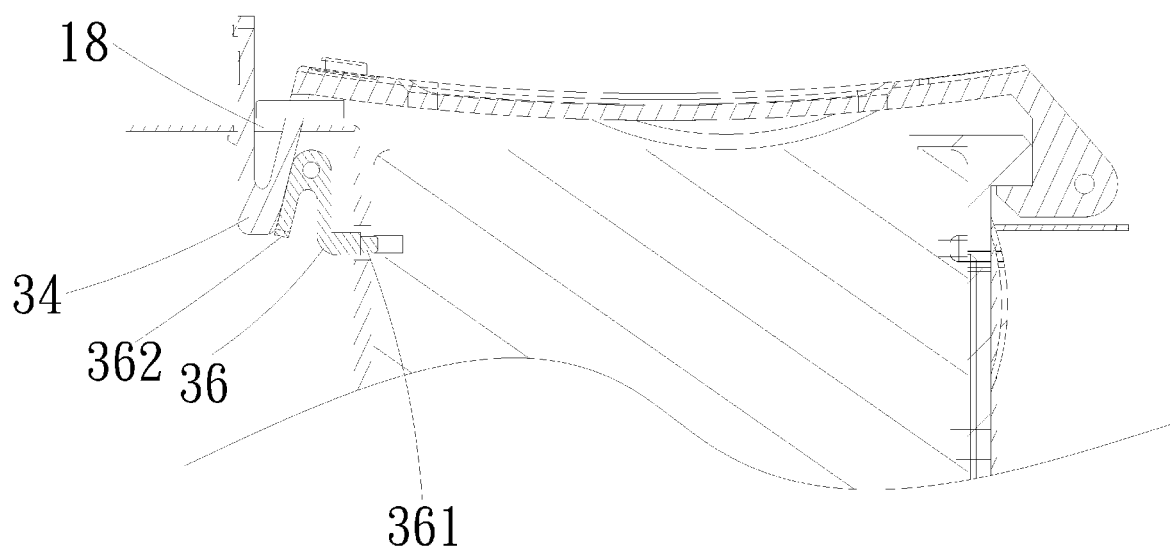
FIG. 10 is a side cross-sectional view of a hard disk carrying apparatus in accordance with a preferred embodiment of the present invention.
Figure 11:
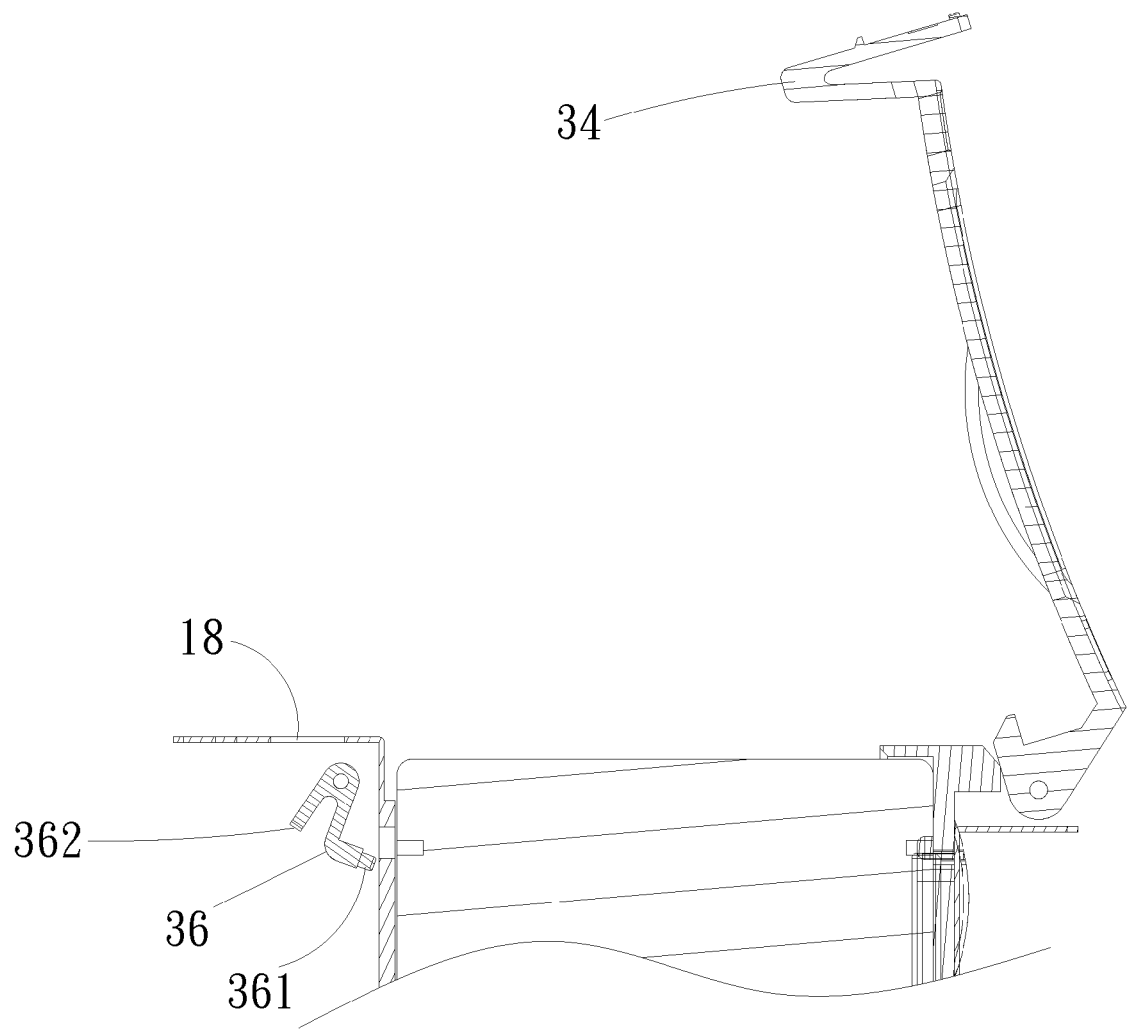
FIG. 11 is a side cross-sectional view of a hard disk carrying apparatus in accordance with a preferred embodiment of the present invention.

With reference to FIGS. 9 to 11, the valve 30 further includes a fixing lock element 36 pivotally installed onto the main body 10 and at a position corresponding to an internal side of the latch slot 18. A latch pillar 361 is disposed at an end of the fixing lock element 36 and selectively passed into the hard disk carrying space of the main body 10 by the motion of pivotally turning the fixing lock element 36 corresponding to the main body 10, thereby the latch pillar 361 being passed into a locking hole formed on a lateral edge of the hard disk 90. At the other end of the fixing lock element 36, a driving handle 362 is disposed and at a position corresponding to the internal side of the latch slot 18. When the locking element 34 is passed into the latch slot 18, the driving handle 362 is pushed by the locking element 34 to pivotally turn corresponding to the main body 10 and drive the latch pillar 361 to pass into the hard disk carrying space, so as to provide fixing mechanism for fixing the hard disk 90.

The heat dissipating fan 40 is installed at a position of a rear side of the main body 10 for dissipating heat produced by the hard disk in the main body 10 by air blowing method.

With the skillful design of the hard disk carrying apparatus of the present invention, the invention provides a plurality of hard disk carrying spaces for carrying a plurality of hard disks 90, and further provides the elastic elements at the top and bottom walls of the hard disk carrying space for fixing the hard disks securely by a clamping method. In addition, the elastic element also provides a vibration absorption effect to prevent unexpected problems of the hard disk 90 caused by colliding, shaking or vibrating the hard disk carrying apparatus and maintain a stable operation of a computer system. Further, a slide rack 20 is disposed on a side of the hard disk 90 for swapping and installing the hard disk. Unlike the conventional tray or fixing box, the present invention can further reduce occupied space to achieve the effects of simplifying the structure, reducing the total weight, and enhancing the heat dissipation of the hard disk 90. In addition, the latch end 33 of the valve 30 is designed for opening and lock protecting the hard disk conveniently and providing a very convenient operation, and the valve 30 includes a door bolt 35 installed thereon for preventing the valve 30 from being opened unexpectedly and further providing a security of the hard disk 90.

What is claimed is:

1. A hard disk carrying apparatus, comprising:
a main body having an accommodating space concavely disposed at a front side of the main body, a plurality of primary slide rails that are adjacent and parallel to each other disposed on a bottom wall in the accommodating space, a position limiting element disposed on a wall at an external end of each primary slide rail, a plurality of secondary slide rails disposed on a top wall in the accommodating space and corresponding to the primary slide rails respectively, wherein the number of the secondary slide rails is equal to the number of the primary slide rails, and each secondary slide rail and each corresponding primary slide rail are provided to define a hard disk carrying space, at least one pushing element disposed on a wall of each secondary slide rail, an electric connection terminal disposed on an internal wall of the main body and at a position corresponding to each hard disk carrying space for installing and coupling a plurality of hard disks, a latch plate disposed at a top edge on the front side of the main body, and a latch slot disposed on the latch plate and at a position corresponding to each hard disk carrying space;
a plurality of slide racks, of each being a long rack, and slidably moved along the primary slide rails respectively to enter and exit the hard disk carrying space, and the slide rack having a shape corresponding to a lateral edge of the hard disk and provided for installing the hard disk, at least one push member disposed on a top side of the slide rack, and a position limiting portion disposed on a wall of the slide rack and selectively latched with the position limiting element to provide a maximum position limit of sliding the slide rack towards an external side, so to prevent the slide rack from sliding out of the hard disk carrying space; and a plurality of valves, of each being a long door plate member, and an end of each valve being a pivot end that is pivotally installed at a bottom edge of the front side of the main body and corresponding to the hard disk carrying space to selectively close an opening of the hard disk carrying space, and the other end of each valve being a latch end that includes a locking element installed thereon and selectively passed into the latch slot and correspondingly latched onto the latch plate to provide a lock protection function.

2. The hard disk carrying apparatus of claim 1, wherein the locking element comprises a fixing plate, an extended press plate and an inverted hook portion, and the fixing plate is disposed at the latch end, and the extended press plate is elastic, extends from and opposite to the fixing plate to form a bent portion with the fixing plate, and the bent portion is corresponding to the latch slot and selectively passed into the latch slot, and the inverted hook portion is disposed on an external wall of the extended press plate, and latched with the latch plate after the bent portion is passed into the latch slot.

3. The hard disk carrying apparatus of claim 2, wherein the fixing plate further includes a through hole formed thereon, and the valve further includes a door bolt installed at the latch end, and the door bolt includes a bolt element and a bolt button, and the bolt element is selectively passed into the through hole of the fixing plate and propped at the extended press plate to stop the extended press plate from moving towards the fixing plate, and the bolt button is disposed on an external wall of the valve for selectively driving the bolt element to protrude and prop at the extended press plate or retract from the extended press plate.

4. The hard disk carrying apparatus of claim 3, wherein each primary slide rail further includes an elastic plate disposed on a wall at an internal end of the primary slide rail for providing an upward elastic force, and the slide rack lies on the elastic plate after the slide rack is passed into the hard disk carrying space.

5. The hard disk carrying apparatus of claim 3, wherein the position limiting element is a position limiting pillar or a position limiting bolt protruded from the primary slide rail, and the position limiting portion is a long slot sheathed onto the position limiting pillar or the position limiting bolt.

6. The hard disk carrying apparatus of claim 3, wherein the pushing element is a pillar shaped element for providing a downward pushing elastic force, and the push member is a pillar shaped element for providing an upward pushing elastic force.

7. The hard disk carrying apparatus of claim 3, wherein the slide rack further includes at least one elastic frictional element disposed on a wall opposite to the primary slide rail, and provided for propping the primary slide rail when the slide rack slides on the primary slide rail.

8. The hard disk carrying apparatus of claim 3, wherein the slide rack further includes a hook portion protruded from an external end of the slide rack, and the valve includes a hook part upwardly extended from the pivot end and disposed corresponding to the hook portion, and provided for hooking the slide rack out during a motion of pivotally opening the main body, and abutting the hook portion to push the slide rack inwardly during a motion of pivotally closing the valve with respect to the main body.

9. The hard disk carrying apparatus of claim 3, further comprising a heat dissipating fan disposed at a position corresponding to a rear side of the main body.

10. The hard disk carrying apparatus of claim 3, wherein the valve further comprises a fixing lock element pivotally installed on the main body and disposed at a position corresponding to an internal side of the latch slot, a latch pillar disposed at an end of the fixing lock element and selectively passed into the hard disk carrying space of the main body by pivotally turning the fixing lock element corresponding to the main body, and a driving handle disposed at the other end of the fixing lock element and corresponding to the internal side of the latch slot, and pushed by the locking element when the locking element is passed into the latch slot, such that the driving handle is pivotally turned and the latch pillar is driven to pass into the hard disk carrying space.

* * * * *